US009395613B2

(12) United States Patent
Abele et al.

(10) Patent No.: US 9,395,613 B2
(45) Date of Patent: Jul. 19, 2016

(54) OPTICAL DEVICE

(75) Inventors: Nicolas Abele, Demoret (CH); Lucio Kilcher, Montreux (CH)

(73) Assignee: INTEL CORPORATION, Santa Clara, CA (US)

( * ) Notice: Subject to any disclaimer, the term of this patent is extended or adjusted under 35 U.S.C. 154(b) by 105 days.

(21) Appl. No.: 14/122,314

(22) PCT Filed: Apr. 3, 2012

(86) PCT No.: PCT/EP2012/056018
§ 371 (c)(1),
(2), (4) Date: Nov. 26, 2013

(87) PCT Pub. No.: WO2012/163574
PCT Pub. Date: Dec. 6, 2012

(65) Prior Publication Data
US 2014/0098350 A1 Apr. 10, 2014

Related U.S. Application Data

(63) Continuation of application No. 61/491,434, filed on May 31, 2011.

(51) Int. Cl.
H04N 9/31 (2006.01)
G03B 21/20 (2006.01)
G01J 1/02 (2006.01)
G02B 26/10 (2006.01)
G02B 27/48 (2006.01)

(52) U.S. Cl.
CPC ........... *G03B 21/2053* (2013.01); *G01J 1/0214* (2013.01); *G02B 26/101* (2013.01); *G02B 26/105* (2013.01); *G02B 27/48* (2013.01); *H04N 9/3129* (2013.01); *H04N 9/3194* (2013.01)

(58) Field of Classification Search
CPC .. H04N 9/3194; G03B 21/2053; G03B 21/20; G01J 1/0214; G02B 27/48
USPC .......................................................... 353/94
See application file for complete search history.

(56) References Cited

U.S. PATENT DOCUMENTS

2008/0062161 A1    3/2008  Brown et al.
2011/0096383 A1*   4/2011  Nomoto et al. ............ 359/204.2
2011/0176068 A1    7/2011  Miller

FOREIGN PATENT DOCUMENTS

EP          2061258 A2     5/2009
JP          2007-114408    5/2007

(Continued)

OTHER PUBLICATIONS

Office Action received for Japanese Patent Application No. 2012-004340, mailed Nov. 4, 2015, 5 pages including 2 pages English translation.

*Primary Examiner* — William C Dowling
*Assistant Examiner* — Ryan Howard

(57) ABSTRACT

According to the present invention, there is provided an optical device comprising, a plurality of light sources each operable to provide a light beam; at least one beam combiner which is operable to combine the light beams from the plurality of light sources, to provide a combined light beam; a beam splitter, which is arranged to receive the combined light beam and to split the combined light beam into a primary light beam and a secondary light beam, wherein one or more characteristics of the secondary light beam are indicative of one or more characteristics of the primary light beam, wherein the beam splitter comprises a first surface through which the primary light beam is emitted from the beam splitter and a second surface through which the secondary light beam is emitted from the beam splitter; a mirror component which comprises a mirror, wherein the mirror component is arranged such that the mirror can reflect the primary light beam which is emitted through the first surface of the beam splitter and wherein the mirror can oscillate about at least one oscillation axis to scan the primary light beam; wherein the optical device further comprises a photodiode which is configured to receive the secondary light beam and to detect one or more characteristics of the secondary light beam, wherein the photodiode is configured to be offset from being parallel to at least one of the first surface or second surface of the a beam splitter, to reduce the amount of parasitic light which is directed to the mirror. There is further provided a corresponding method of projecting an image.

18 Claims, 10 Drawing Sheets

(56) References Cited

FOREIGN PATENT DOCUMENTS

| | | |
|---|---|---|
| JP | 2008-134350 | 6/2008 |
| JP | 2007-65627 | 9/2008 |
| JP | 2009-533715 | 9/2009 |
| JP | 2010-536057 | 2/2011 |
| JP | 2012-145755 | 8/2012 |
| WO | WO 2009154134 A1 * | 12/2009 |
| WO | 2010/146974 | 12/2010 |

* cited by examiner

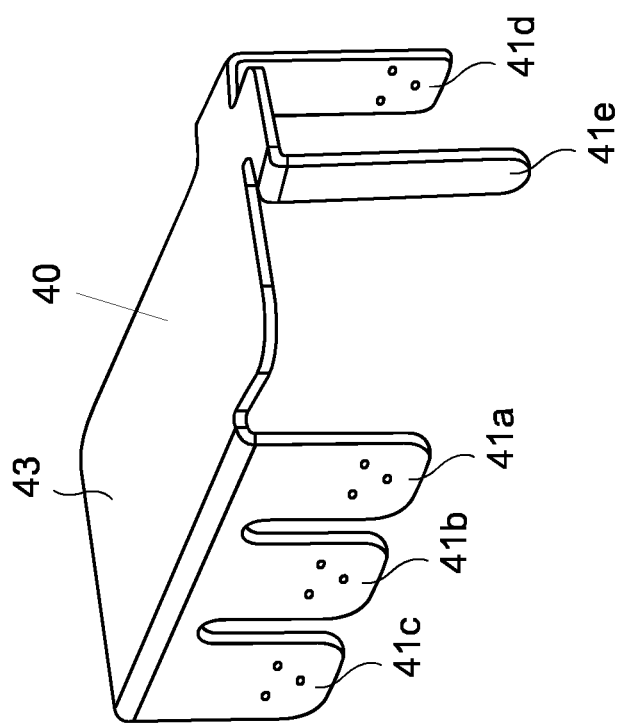

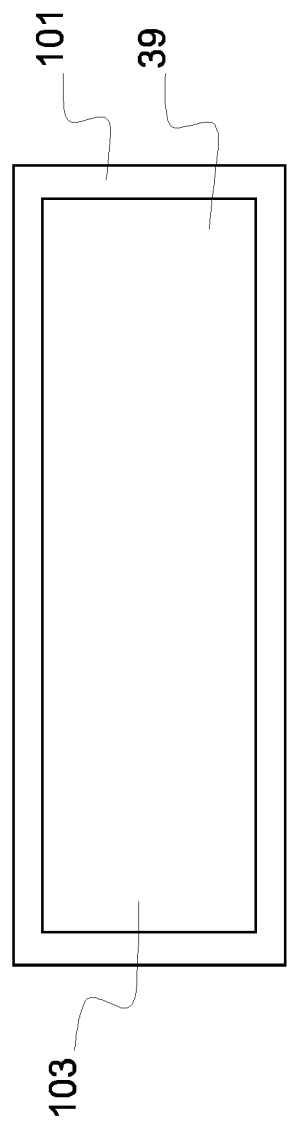

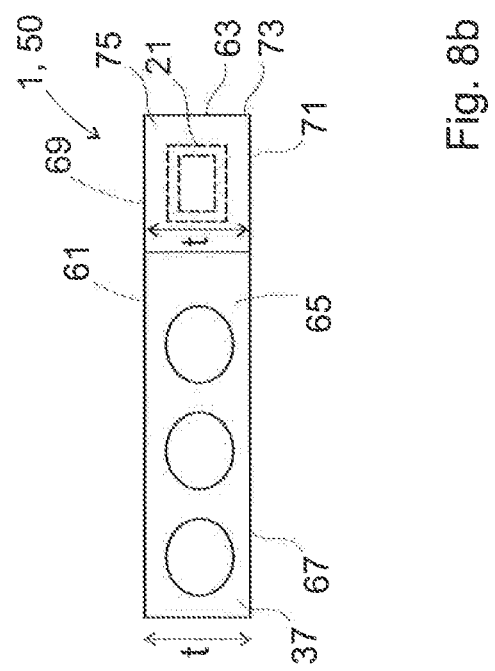
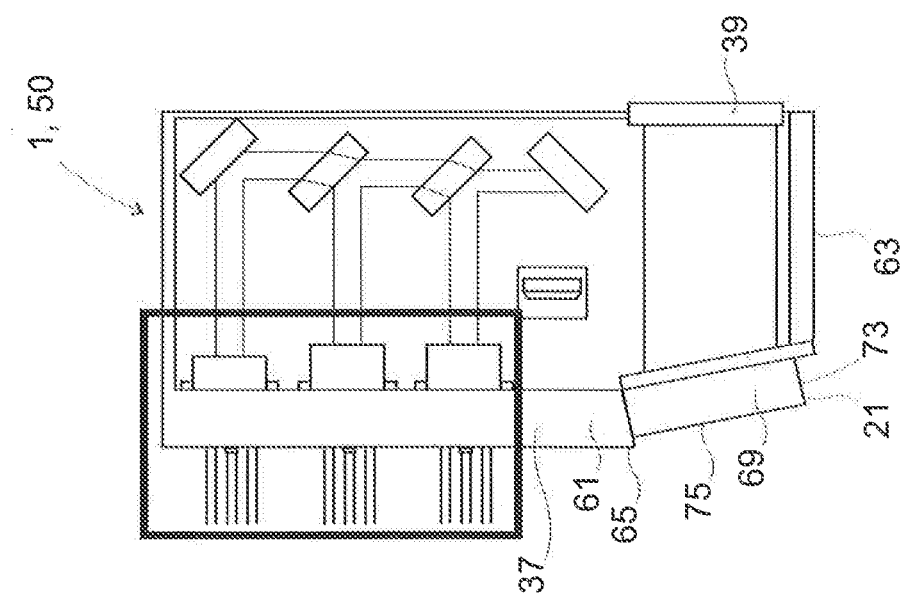
Fig. 8b
Fig. 8a

OPTICAL DEVICE

FIELD OF THE INVENTION

The present invention relates to an optical device, and in particular, but not exclusively to an optical device which comprises a photodiode which is arranged to reduce the effects of parasitic light.

DESCRIPTION OF RELATED ART

It is critical to control the light which is projected by projection devices. Such control is necessary to ensure that the projected image color balance is not influenced by environmental and system temperature drifts as well as to ensure that a clear, sharp, image is projected by the projection device.

Direct measurement of the light projected by a projection device is not typically carried out, as an optical sensor which is configured to directly measure light projected by the projection device would interfere with the projected light and would therefore compromise the quality of the image projected. Therefore, typically, optical sensors are positioned within the projection device and are arranged such that they measure light within the projection device before it is projected. The characteristics of the light measured by the optical sensor are assumed to be the same as the characteristics of the light projected by the projection device; and control of the projection device so that it projects light which has predefined characteristics, is carried out on the basis of the light measured by the optical sensor. However, in existing projection devices, after the light is sensed by the optical sensors, it is passed through one or more further optical elements before being projected. Optical losses occur as the light passes through these further optical elements; accordingly the characteristics of the light measured by the optical sensor will be very different to the characteristics of light projected by the projection device. Thus, accurate control of the projection device so that it projects light which has predefined characteristics, cannot be achieved.

Optical components, such as optical sensors, within a projection device will generate parasitic light. The positioning of optical components within a projection device is critical to minimising the projection of parasitic by the projection device. Parasitic light projected by the projection device can compromise the quality of the image projected. In existing projection devices, the optical components, such as optical sensors, are not optimally positioned to minimise the projection of parasitic light.

Additionally, minimising the size of a projection device is critical if for example the projection device is to be incorporated into a mobile phone or camera. Smaller projection devices typically use MEMS micro-mirror devices to project light. With existing projection devices these MEMS micro-mirror devices are housed in a package. Disadvantageously, the package increases the size of the projection device as it must at least be large enough to receive the MEMS micro-mirror. The projection devices with such packages are too large for certain applications.

It is an aim of the present invention to obviate, or mitigate, at least some of the above-mentioned disadvantages.

BRIEF SUMMARY OF THE INVENTION

According to the present invention, there is provided an optical device comprising, a plurality of light sources each operable to provide a light beam; at least one beam combiner which is operable to combine the light beams from the plurality of light sources, to provide a combined light beam; a beam splitter, which is arranged to receive the combined light beam and to split the combined light beam into a primary light beam and a secondary light beam, wherein one or more characteristics of the secondary light beam are indicative of one or more characteristics of the primary light beam, wherein the beam splitter comprises a first surface through which the primary light beam is emitted from the beam splitter and a second surface through which the secondary light beam is emitted from the beam splitter; a mirror component which comprises a mirror, wherein the mirror component is arranged such that the mirror can reflect the primary light beam which is emitted through, or reflected by, the first surface of the beam splitter and wherein the mirror can oscillate about at least one oscillation axis to scan the primary light beam; wherein the optical device further comprises a photodiode which is configured to receive the secondary light beam and to detect one or more characteristics of the secondary light beam, wherein the photodiode is configured to be offset from being parallel to at least one of the first surface or second surface of the a beam splitter, to reduce the amount of parasitic light which is directed to the mirror.

The optical device may comprise a charge-coupled device (CCD) e.g. CCD sensor, CMOS sensor, a photodiode array or a single photodiode.

Optionally, a semi-reflective or semi-transmissive element may be provided instead of, or in addition to, the beam splitter.

Typically, the primary light beam which is reflected by the mirror, is used to project an image onto a display screen.

By arranging the photodiode to be offset from being parallel to at least one of the first surface or second surface of the beam splitter, parasitic light which is generated at the photodiode will be directed away from the beam splitter; consequently the parasitic light will not be transmitted by the beam splitter to the mirror. Any parasitic light which does reach the beam splitter will be deflected away from the direction of the mirror. Thus, parasitic light generated at the photodiode will not be received by the mirror. Typically, the primary light beam when reflected and scanned by the mirror defines an image; so typically the mirror projects an image onto a display screen. As the mirror will receive less parasitic light the quality of an image which is projected will be improved.

As one or more characteristics of the secondary light beam are indicative of one or more characteristics of the primary light beam, the detected one or more characteristics of the secondary light beam can be used to monitor the characteristics of the primary light beam which is provided to the mirror for scanning.

The one or more characteristics may comprise at least one of; light intensity, light wavelengths, light modulation speed, light beam alignment (between the one or more light beams), light beam size/shape at the photodiode surface, speckle level, laser mode, laser divergence, astigmatism, laser beam homogeneity, laser ageing.

The mirror component is preferably a MEMS mirror device. A MEMS mirror device is a device that contains an optical MEMS (Micro-Electrical-Mechanical-System). The optical MEMS may comprise a cylindrical, rectangular or square micro-mirror that is adapted to move and to deflect light over time. The micro-mirror is usually connected by torsion arms to a fixed part and can tilt and oscillate along one or two axis. Different actuation principles can be used, including electrostatic, thermal, electro-magnetic or piezo-electric. MEMS micro-mirror devices are known in which the area of these micro-mirrors are around a few $mm^2$. The MEMS micro-mirror device may comprise a single micro-mirror which is configured to oscillate along two oscillation axes to scan light along both the horizontal and vertical. Alternatively The MEMS micro-mirror device may comprise a first MEMS micro-mirror which is configured to oscillate a long a first oscillation axis, to scan light along the horizontal, and a second MEMS micro-mirror which is configured to oscillate a long a second oscillation axis to scan light along the vertical. Preferably the first and the second MEMS micro-mirror will be precisely positioned such that the oscillatory axes are orthogonal.

The combined light beam may also be received into the beam splitter through the first surface.

The one or more light sources may comprise one or more lasers.

The photodiode may be further configured to be offset from being parallel to both the first surface and second surface of the beam splitter.

The photodiode may be an avalanche photodiode. It will be understood that any other component which has photodiode behaviour could be used instead of a photodiode.

The first surface of the beam splitter may further comprise an anti-reflective coating. The second surface of the beam splitter may further comprise an anti reflective coating. The anti reflective coating may comprise single or multiples layers of dielectric materials or metal oxide, such as $SiO_x$, $Si_xN_y$, MgO, $MgF_x$, $Ti_xO_y$.

The optical device may further comprise a controller which is in operable communication with the photodiode to receive data relating to one or more characteristics of the secondary light beam which are indicative of one or more characteristics of the primary light beam, and to control each of the plurality of light sources so that one or more characteristics of the primary light beam are maintained at one or more predefined characteristics.

The optical device may further comprise a detecting means for detecting the position on photodiode where the secondary light beam is incident. This will allow misalignment of a light source (e.g. laser) to be detected. For example, if secondary light is detected at a position on the photodiode which is outside a predefined area on the photodiode, then it can established that one or more of the light sources are misaligned. This is particularly useful during the manufacturing stages; during these stages, before incorporating the mirror component into the optical device, a test can be carried out using the detecting means, to detect if the light sources are aligned as required. If it is found that the light sources are aligned correctly (for example, the detecting means for detecting the position on photodiode where the secondary light beam is incident, detects secondary light beam is incident at a position on the photodiode which is inside a predefined area) then the optical device can be completed by incorporating the mirror component. In many case however, due to manufacturing defects, or mishandling for example, the light sources will not be aligned. An optical device with misaligned light sources cannot function properly and these defective optical devices must be discarded. If the detecting means shows that the light sources are not aligned (for example, the detecting means for detecting the position on photodiode where the secondary light beam is incident, detects secondary light beam is incident at a position on the photodiode which is outside of a predefined area), then the optical device can be discarded before a mirror component is incorporated into the optical device. Thus, the detecting means enables for mirror components to be incorporated only into those optical devices in which the light sources are correctly aligned.

The optical device may be configured such that the beam splitter is in direct optical communication with the mirror. In this case there is no optical elements interposed between the beam splitter and mirror; as the mirror can receive the primary light beam directly from beam splitter without having to pass though any further optical elements, there will be little, or no, optical losses as the primary light beam passes from the beam splitter to the mirror. Consequently there will be little, or no, difference between the characteristics of the primary light beam which is at the beam splitter and the primary light beam which eventually reaches the mirror. Accordingly, the measure of the characteristics of secondary light beam taken by the photodiode at the beam splitter will provide an accurate representation of the characteristics of the primary light beam which is received at the mirror. More accurate control of the primary light beam reaching the mirror can thus be implemented and consequently more accurate control of the primary light beam which is reflected and scanned by the mirror can be achieved. If the primary light beam which is reflected and scanned by the mirror is used to project an image onto a display screen, then the improved, more accurate, control of the primary light beam reaching the mirror, which is provided by the present invention, allows for improved control of the characteristics of the projected image.

The optical device according may further comprise a package with a window through which the primary light beam reflected by the mirror can pass, wherein the optical device further comprises a reflective surface which is arranged to receive the primary light beam from the beam splitter and to reflect the primary beam to the mirror, wherein the reflective surface is configured to be integral to the window. The integration of the reflective surface into the window, provides for a more compact optical device.

The beam combiner, beam splitter, and mirror may be arranged such that the primary light beam reflected by the mirror passes through the combined light beam, to reduce speckle in the primary light beam reflected by the mirror. The combined light beam may pass from the beam combiner to the beam splitter. The interaction of the primary light beam reflected by the mirror, with the combined light beam reduces speckle in the primary light beam reflected by the mirror i.e. provides an anti-speckle effect. The reduction in speckle enables a sharper image to be projected onto a display screen by the optical device.

The optical device may further comprise a window, through which the primary light beam reflected by the mirror can pass, wherein the window is configured to adjust the optical characteristics of the primary light beam passing through it. The window may be configured to focus the primary light beam which passes through it. The window may be configured to diverge the primary light beam which passes through it. The window may be configured to redirect the direction of the primary light beam which passes through it. For example, the window may be configured to redirect a primary light beam which is travelling along the horizontal normal so that the primary light beam is projected at a 45° angle to the horizontal normal.

The window may be configured to reduce speckle effects. For example, the window may be configured to vibrate so as to reduce speckle effects. The window may further comprise a speckle reducing layer. The speckle reducing layer may be configured to vibrate so as to further reduce speckle effects. The speckle reducing layer may comprise material which can diffuse light. The speckle reducing layer may comprise material which is configured to create multiple output light angle from a light beam which passes through the speckle reducing layer. The multiple output light angle may be small in order not to lose the light beam collimation or focused but still reducing speckle. The speckle reducing layer may comprise material which is configured to create multiple polarization of a light beam that passes through the speckle reducing layer. The speckle reducing layer may comprise material which is configured to create multiple wavelengths from a light beam which passes through the speckle reducing layer. The speck reducing layer may be an anti-speckle layer.

Material which can be used in the speckle reducing layer or material which can be used to create multiple output light angle from an input light beam, may be material which is typically diffractive, diffusive or material which creates holographic patterns in a semi-transparent medium like a polymer or a PMMA (Poly-methyl methacrylate), or material composed of nano-material which has the capabilities of diffusing or diffracting light. The creation of multiple polarization of a light beam can be done by having a LCD transmissive panel, which by default changes the light polarization. The window may be configured to dim light. The window may comprise a layer which is configured to dim light which passes through the window. The window preferably comprises an LCD transmissive panel the polarization of which can be adjusted. By changing the polarization of the LCD transmissive panel, the properties e.g intensity, of the light which pass through the LCD transmissive panel can be changed; therefore the intensity of the light output from the window can be reduced thus achieving dimming of light.

The window may further comprise a functional part. The functional part may be integral or integrated into the window. The functional part preferably extends over part of a whole surface of the window. The functional part may comprise a photodiode which is configured to measure one or more characteristics of light which passes through the window. For example, the photodiode may be configured to measure light intensity and/or alignment of light which passes through the window. The functional part may comprise a reflective surface. The reflective surface may be arranged to reflect at least some of the light which passes through the window to a sensing device which is configured to sense one or more characteristics of the light. The sensing device may be a photodiode. The functional part may comprise a light absorption layer. The light absorption layer may comprise high absorption material. The light absorption layer may be arranged to reduce parasitic reflection of light from the window. The light absorption layer may be arranged to reduce the reflection of parasitic light from the window. For example, the light absorption layer may prevent the reflection of parasitic light by the window to inside the optical device.

The optical device may further comprise a second beam splitter. The second beam splitter is preferably arranged to deflect a part of the combined light beam. The second beam splitter may be arranged to deflect a part of the combined light beam to the mirror in the optical device. Deflecting the light to the mirror enables characteristics of the mirror to be detected e.g. the speed of oscillation of the mirror and the position of the mirror can be detected. The second beam splitter may be arranged to deflect a part of the combined light beam to a device which is operable to detect one or more characteristics of light. Deflecting the light to the device which is operable to detect one or more characteristics of light, enables characteristics of the combined light beam to be detected e.g. brightness, wavelengths etc. The second beam splitter may be arranged to deflect a part of the combined light beam to the mirror in the optical device and/or to a device which is operable to detect one or more characteristics of light.

As discussed the optical device may comprise a second beam splitter. The optical device may further comprise one or more additional photodiodes. Preferably, the optical device comprises a second and third photodiode. The second beam splitter may be arranged in an optical path between the beam combiner and the beam splitter. The second beam splitter may be arranged to receive light from the beam combiner and to deflect a part of the light to the mirror. The second beam splitter is configured so that the part of the light which is not deflected to the mirror is passed to the beam splitter.

The one or more additional photodiodes are preferably arranged such that they can receive light which has been received at the mirror from the second beam splitter, and deflected from the mirror. The second and third photodiodes are preferably arranged such that they can receive light which has been received at the mirror from the second beam splitter, and deflected from the mirror. The mirror may be arranged to deflect the light it receives from the second beam splitter to a second and third photodiode.

The one or more additional photodiodes may be configured to sense one or more characteristics of the light they receive from the mirror. The second and third photodiodes may be configured to sense one or more characteristics of the light they receive from the mirror. The second and third photodiodes may be configured to sense the position of the light beam which they receive from the mirror. The position of the light beam correlates to the scanning angle of the mirror. Preferably, the second and third photodiodes are configured sense the rate of change of the position of the light beam which they receive from the mirror. The rate of change of the position of the light beam correlates to the speed of the oscillation of the mirror. Therefore detecting characteristics of the light deflected from the mirror enables parameters of the mirror to be indirectly determined; for example parameters such as mirror oscillation frequency can be determined from the rate of change of position of the light beam, motion phase can be sensed as well when comparing the position of the light beam deflected by the mirror with the actuation signal, and mirror scanning angle can be determined from the position of the light beam.

The second beam splitter may be arranged to receive light from the beam combiner and to deflect a part of the light to a device which is configured to detect one or more characteristics of light. The device may be a photodiode, a spectrometer, or any other means operable to detect one or more characteristics of light. The second beam splitter may be arranged in an optical path between the beam combiner and the beam splitter. The second beam splitter is preferably configured so that the part of the light which is not deflected to the device, is passed to the other beam splitter.

The optical device may further comprise a package wherein the mirror component defines at least part of a surface of the package. The package may house at least the plurality of light sources, beam combiner, beam splitter, and photodiode.

The mirror component may define at least part of an upper surface and lower surface of the package. Thus, the overall thickness of the package can be reduced as it is not necessary for the package to extend over the upper and lower surfaces of the mirror component.

The mirror component may define at least part of four surfaces of the package. For example, the mirror component may define at least part of, an upper surface, lower surface, a first side surface and second side surface, of the package.

The optical device may comprise a single electrically conducting member which is configured to electrically connect each of the light sources, photodiode, and mirror component. The single electrically conducting member may comprise flexible material. The single electrically conducting member may comprise a mono flex circuit.

According to a further aspect of the present invention there is provided a projection device comprising an optical device according to any one of claims According to a further aspect of the present invention there is provided a method of projecting an image comprising the step of operating a plurality of light sources so that each light source provides a light beam, combining the light beams to provide a combined light beam splitting the combined light beam using a beam splitter, into a primary light beam and a secondary light beam wherein characteristics of the secondary light beam indicate characteristics of the primary light beam, wherein the beam splitter comprises a first surface through which the primary light beam is emitted from the beam splitter and a second surface through which the secondary light beam is emitted; receiving the secondary light beam at a photodiode which is configured to be offset from being parallel to at least one of the first surface or second surface of the a beam splitter; detecting one or more characteristics of the secondary light beam using the photodiode; processing the detected one or more characteristics of the secondary light beam to determine characteristics of the primary light beam; scanning the primary light beam to project an image onto a display screen.

The optical device may comprise a charge-coupled device (CCD) e.g. CCD sensor, CMOS sensor, a photodiode array or a single photodiode.

Optionally, a semi-reflective or semi-transmissive element may be provided instead of a beam splitter.

The method may further comprise the step of adjusting one or more of the plurality of light sources so that one or more characteristics of the primary light beam match one or more predefined characteristics.

According to a further aspect of the present invention there is provided an optical device comprising, a mirror which can reflect light and which oscillate about one or more oscillation axes to scan the reflected light; a plurality of optical elements wherein the plurality of optical elements are arranged such that they can provide light to the mirror such that mirror can reflect the light and can oscillate about its one or more oscillation axes to scan the reflected light, wherein the optical device further comprises a photodiode which is in optical communication with an optical element which is in direct optical communication with the mirror, such that it can detect one or more characteristics of the light which is sent by said optical element to the mirror.

There will be no, or at least very little, optical losses as light travels from the optical element which is in direct optical communication with the mirror to the mirror, as the light does not interact with any further optical elements before reaching the mirror. Consequently, the characteristics of light measured at the optical element which is in direct optical communication with the mirror, will be the same, or at least almost the same, as the characteristics of the light which reaches the mirror. Accordingly, by providing the photodiode in optical communication with the optical element which is in direct optical communication with the mirror, one can accurately measure the characteristics of the light which is reflected and scanned by the mirror. Thus, the light reflected and scanned by the mirror can be more accurately controlled. If the mirror is uses to project an image, the present invention enables improved control of the characteristics of the projected image as a more accurate characterisation of the light projected by the mirror can be achieved.

According to a further aspect of the present invention there is provided a package module suitable for housing one or more optical elements, wherein the package module is configured such that it can co-operate with a mirror component to form a package wherein the mirror component defines at least part of a surface of the package.

According to a further aspect of the present invention there is provided an optical device comprising a package which houses one more optical elements, wherein the optical device comprises a mirror component, wherein the mirror component is configured to define at least part of a surface of the package.

In each of the above aspects the mirror component may define at least part of an upper surface and lower surface of the package.

In each of the above aspects the mirror component may define at least part of four surfaces of the package. For example, the mirror component may define at least part of, an upper surface, lower surface, a first side surface and second side surface, of the package.

In each of the above aspects/embodiments, the mirror component is preferably a MEMS micro mirror device.

The plurality of light sources may comprise lasers.

BRIEF DESCRIPTION OF THE DRAWINGS

The invention will be better understood with the aid of the description of embodiments, which are given by way of example only, and illustrated by the figures, in which:

FIG. 3 provides a perspective view of a single electrically conducting member user in the device of FIG. 1;

FIGS. 8a and 8b provide an aerial view and side view, respectively, of a package of an optical device according to the present invention.

DETAILED DESCRIPTION OF POSSIBLE EMBODIMENTS OF THE INVENTION

Figure 1:
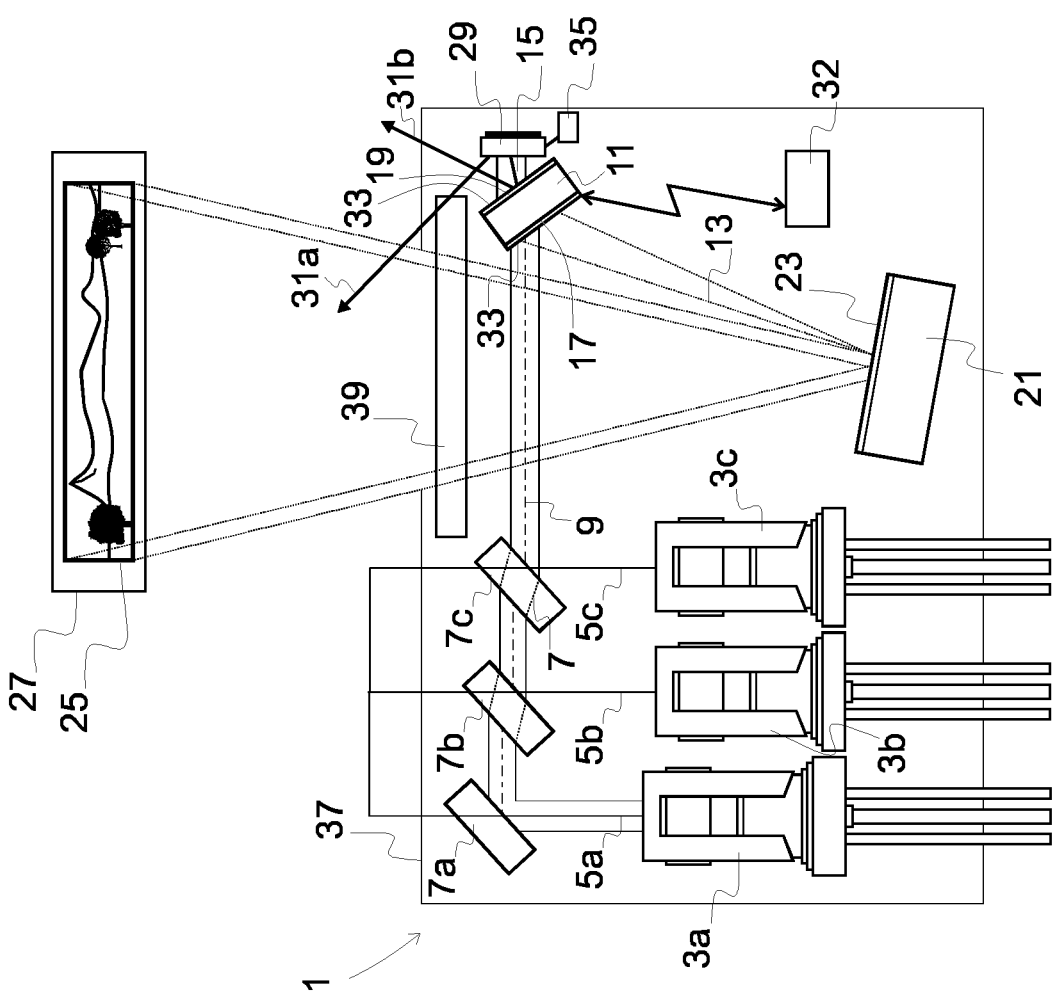
FIG. 1 provides an aerial view of an optical device according to an embodiment of the present invention.

FIG. 1 provides an aerial view of an optical device 1 according to an embodiment of the present invention.

The optical device 1 comprises, three of light sources 3a,b,c each operable to emit a light beam 5a,b,c. Preferably, the light sources 3a,b,c are in the form of lasers. In this particular example, light source 3a emits a red light beam 5a; light source 3b emits a green light beam; and light source 3c emits a blue light beam 5c. It should be understood that the invention is not limited to having this particular colour sequence; the light sources 3a,b,c may have any other colour sequence; for example light source 3a may emit a green light beam; light source 3b may emit a blue light beam; and light source 3c may emit a red light beam.

The emitted light beams 5a,b,c are directed to a beam combiner 7 where they are combined to provide a combined light beam 9. The beam combiner may optionally be defined by a single piece or may be defined by a plurality of pieces; for example the beam combiner 7 may be defined by three semi-reflective windows 7a,7b,7c as is the case in the optical device 1 shown in FIG. 1.

The optical device 1 further comprises a beam splitter 11. The beam splitter 11 is arranged to receive the combined light beam 9 and to split the combined light beam 9 into a primary light beam 13 and a secondary light beam 15. The primary light beam 13 is configured to define a series of pixels of an image such that when the primary light beam 13 is projected onto a display screen, a projected image will appear on the display screen. One or more characteristics of the secondary light beam 15 are indicative of one or more characteristics of the primary light beam 13. For example, the brightness or intensity of the secondary light beam 15 is proportional to the brightness or intensity of the primary light beam 13; or the proportion of red, green and blue light in the secondary light beam 15 is the same as the proportion of the red, green and blue light in the primary light beam 13.

The beam splitter 11 comprises a first surface 17 through which it receives the combined light beam 9 and through which the primary light beam 13 is emitted from the beam splitter 11. The beam splitter 11 also comprises a second surface 19; the secondary light beam 15 is emitted from the beam splitter 11 through the second surface 19. The first surface 17 and second surface 19 of the beam splitter 11 are each provided with an anti-reflective coating 33. The antireflective coating 33 may comprise single or multiples layers of dielectric materials or metal oxide, such as $SiO_x$, $Si_xNy$, $MgO$, $MgF_x$, $Ti_xO_y$.

The optical device 1 further comprises a mirror component, in the form of a MEMS micro-mirror device 21. The MEMS micro-mirror device 21 comprises MEMS micro-mirror 23 which is arranged such that it can reflect the primary light beam 13, received from the beam splitter 11, to a display screen 27. The MEMS micro-mirror 23 can also oscillate about at least one oscillation axis to scan the primary light beam 13; in this particular example the MEMS micro-mirror 23 is configured such that it can oscillate about two orthogonal oscillation axes so that the MEMS micro-mirror 23 can scan light in both horizontal and vertical directions along the display screen 27. The primary light beam 13 which is reflected and scanned by the MEMS micro-mirror 23, defines an image 25 on the display screen 27 i.e. a projected image 25.

The optical device 1 comprises a photodiode 29. The photodiode 29 is configured to receive the secondary light beam 15 from the beam combiner 11. The photodiode 29 is configured to detect one or more characteristics of the secondary light beam 15; for example the photodiode 29 is configured to detect the brightness or intensity of the secondary light beam 15 and/or the proportion of red, green and blue light in the secondary light beam 15. As the characteristics of the secondary light beam 15 are indicative, or proportional, to one or more characteristics of the primary light beam 13, the detected characteristics of the secondary light beam 15 can be used to monitor the characteristics of the primary light beam 13 which is projected by the MEMS micro-mirror 23. The optical characteristics of the projected image 25 can be controlled by controlling the characteristics of the primary light beam 13.

The photodiode 29 is arranged so that it is offset from being parallel to the second surface 19 of the beam splitter 11. By arranging the photodiode 29 to be offset from being parallel to the second surface 19 of the a beam splitter 11, parasitic light 31a which is generated at the photodiode 29 light will, in general, be directed away from the beam splitter 11; consequently, the parasitic light 31a will not be transmitted by the beam splitter 11 to the MEMS micro-mirror 23. Any parasitic light 31b which does reach the beam splitter 11 will be deflected away from the MEMS micro-mirror 23 by the beam splitter 11; as the photodiode 29 is arranged to be offset from being parallel to the second surface 19, the parasitic light 31b will therefore have angle of incidence which will ensure that the parasitic light 31b will be deflected away from the MEMS micro-mirror 23. The antireflective coating 33 on the beam splitter 11 will further enhance the beam splitter's ability to deflect parasitic light 31 away from the MEMS micro-mirror 23. Thus, parasitic light generated at the photodiode 29 will not be received by the MEMS micro-mirror 23. As the MEMS micro-mirror 23 will receive less parasitic light the quality of an image 25 which is projected onto the display screen 27 will be improved. In the particular example shown in FIG. 1, the photodiode 29 is arranged so that it is also offset from being parallel to the first surface 17 of the beam splitter 11.

As shown in FIG. 1, the beam combiner 7 (defined in this example by three semi-reflective windows 7a,7b,7c), beam splitter 11, MEMS micro-mirror device 21 are arranged such that the primary light beam 15, which is reflected by the MEMS micro-mirror 23, passes through the combined light beam 9 which passes from the beam combiner 7 to the beam splitter 11. This has the effect to reducing speckle in the primary light beam 15 which is reflected by the MEMS micro-mirror 23. The reduction in speckle provides for a clearer and sharper projected image 25.

The optical device 1 also comprise a controller 32 which is in operable communication with the photodiode 29 to receive data relating to one or more characteristics of the secondary light beam which is measured by the photodiode 29. The controller 32 can process the data relating to one or more characteristics of the secondary light beam to derive data relating to one or more characteristics of the primary light beam 13. The controller 32 is also in operable communication with each of the light sources 3a,b,c and can control each of the light sources 3a,b,c so that one or more characteristics of the primary light beam 13 are maintained at one or more predefined characteristics. By controlling the primary light beam 13 the optical characteristics of the projected image 25 are controlled. Thus, by controlling the characteristics of the primary light beam 13 so that they are maintained at one or more predefined characteristics, the optical characteristics of the projected image 25 can be maintained at predefined optical characteristics. It should be noted that the controller 32 may be a micro controller; and the controller 32 may be configured to also communicate with another digital processing unit (microcontroller, FPGA, etc. . . . ) in order to share the information or to compute or execute algorithms.

The optical device 1 can be operated to project the image 25 onto the display screen 27. During operation the light sources 3a,b,c operate to emit a red light beam 5a; a green light beam 5b; and a blue light beam 5c, respectively. The light beams 5a,b,c are combined in the beam combiner 7 to provide a combined light beam 9. The beam splitter 11 then splits the combined light beam 9, into a primary light beam 13 and a secondary light beam 15 wherein characteristics of the secondary light beam 15 are indicative of characteristics of the primary light beam 13. The primary light beam 13 is emitted from the beam splitter 11 through the first surface 17 of the beam splitter 11 and the secondary light beam is emitted from the beam splitter 11 through the second surface 19 of the beam splitter 11. The secondary light beam 15 is received at the photodiode 29 which is configured to be offset from being parallel to the second surface 19 of the beam splitter 11. One or more characteristics of the secondary light beam 15 are detected using the photodiode 29. The one or more characteristics of the secondary light beam 15 which are detected by the photodiode 29 are processed to determine characteristics of the primary light beam 13. The light sources 3a,b,c may be adjusted by the controller 32 so that the determined characteristics of the primary light beam 13 match predefined characteristics. The MEMS micro-mirror 23 of the MEMS micro-mirror device 21 reflects the primary light beam 13 towards the display screen 27 and is oscillated about its oscillation axes to scan the primary light beam 13 across the display screen to display a projected image 25 onto the display screen 27. By controlling the light sources 3a,b,c so that the determined characteristics of the primary light beam 13 match predefined characteristics, the optical characteristics of the projected image 27 can be maintained at predefined optical characteristics.

The optical device 1 further comprises a detecting means 35 for detecting the position on photodiode 29 where the secondary light beam 15 is incident. This detecting means 35 may be configured to be integral to the photodiode 29. This will allow misalignment of a light source 3,a,b,c to be detected. For example, if secondary light 15 is detected at a position on the photodiode 29 which is outside a predefined area on the photodiode 29, then it can established that one or more of the light sources 3a,b,c are misaligned. This is particularly useful during the manufacturing stages; during these stages, before incorporating the MEMS micro-mirror device 21 into the optical device, a test can be carried out using the detecting means 35 to detect if the light sources 3a,b,c are aligned as required. If it is found that the light sources 3a,b,c are aligned correctly (for example, the detecting means 35 for detecting the position on photodiode 29 where the secondary light beam 15 is incident, detects secondary light beam 15 is incident at a position on the photodiode 29 which is inside a predefined area) then the optical device 1 can be completed by incorporating the MEMS micro-mirror device 21. In many cases however, due to manufacturing defects, or mishandling for example, the light sources 3a,b,c will not be correctly aligned. An optical device 1 with misaligned light sources 3a,b,c cannot function properly and these defective optical devices must be discarded. If the detecting means 35 shows that the light sources 3a,b,c are not aligned (for example, the detecting means 35, detects secondary light beam 15 is incident at a position on the photodiode 29 which is outside of a predefined area) then the optical device 1 can be discarded before a MEMS micro-mirror device 21 is incorporated into the optical device 1. Thus, the detecting means 35 enables for MEMS mirror devices 21 to be incorporated only into those optical devices 1 in which the light sources 3a,b,c are correctly aligned.

In the embodiment shown in FIG. 1 the optical device 1 is configured such that the beam splitter 11 is in direct optical communication with the MEMS micro-mirror 23 of the MEMS micro-mirror device 21. Accordingly there are no optical elements interposed between the beam splitter 11 and the MEMS micro-mirror 23. As the MEMS micro-mirror 23 receives the primary light beam 13 directly from beam splitter 11 without having to pass though any further optical elements, there will be little, or no, optical losses as the primary light beam 13 passes from the beam splitter 11 to the MEMS micro-mirror 23. Consequently, there will be little, or no, difference between the characteristics of the primary light beam 15 which is at the beam splitter 11 and the characteristics of the primary light beam 15 which eventually reaches the MEMS micro-mirror 23 and is reflected. Accordingly, the measure of the characteristics of secondary light beam 15 taken by the photodiode 29 at the beam splitter 11 will provide an accurate representation of the characteristics of the primary light beam 15 which is received and reflected by the MEMS micro-mirror 23. As a result more accurate control of the primary light beam 15 reaching the MEMS micro-mirror 23 can thus be implemented and consequently more accurate control of the primary light beam 15 which is reflected and scanned by the MEMS micro-mirror 23 can be achieved. This enables the optical characteristics of the projected image 25 to be more accurately controlled.

Figure 2C:
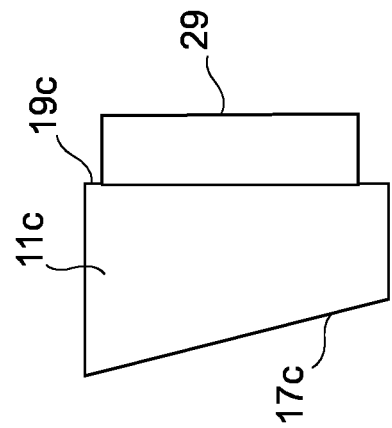
FIGS. 2a-c provide side views of different possible configurations for the beam splitter 11 and photodiode 29 in the optical device 1 shown in FIG. 1.
Figure 2B:
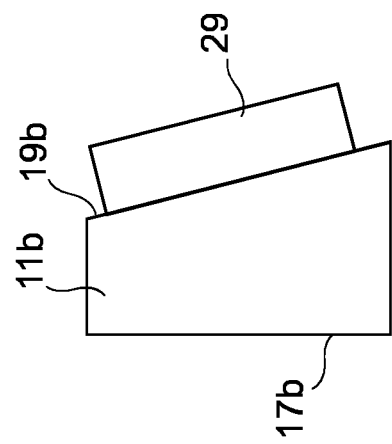
Figure 2A:
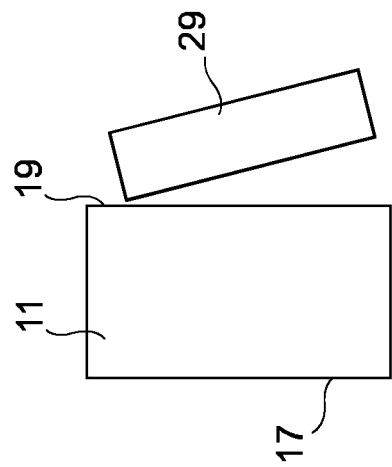

FIGS. 2a-c provide side views of different possible configurations for the beam splitter 11 and photodiode 29 in the optical device 1 shown in FIG. 1. FIG. 2a shows a standard beam splitter 11 in which the first surface 17 and second surface 19 of the beam splitter are parallel. The photodiode 29 is arranged so that it is offset from being parallel to both the first surface 17 and second surface 19 of the beam splitter 11. In the optical device shown in FIG. 1 the beam splitter 11 and photodiode 29 are arranged as shown in FIG. 2a. However, it should be understood that in order for the invention to work the photodiode 29 need only be offset from being parallel to at least one of the first surface 17 or second surface 19. Thus, to achieve the advantageous effects of the present invention the photodiode 29 need only be arranged so that it is offset from being parallel to the first surface 17 or second surface 19 of the beam splitter 29. FIGS. 2b and 2c show possible configurations for the beam splitter 11 and photodiode 29, wherein the photodiode 29 is offset from being parallel to one of first surface 17 or second surface 19 of the beam splitter 29.

FIG. 2b shows a beam splitter 11b; unlike the beam splitter 11 shown in FIG. 2a the first surface 17b and second surface 19b of the beam splitter 11b are not parallel; rather the beam splitter 11b is wedge-shaped. The beam splitter 11b is configured such that its first surface 17b is vertical and the second surface 19b of the beam splitter 11b is offset from the vertical normal. The photodiode 29 is arranged to be parallel to the second surface 19b of the beam splitter 11b. As the first surface 17b and second surface 19b of the beam splitter 11b are not parallel, by arranging the photodiode 29 so that it is parallel to the second surface 19b, the photodiode 29 will be arranged so that it is offset from being parallel to the first surface 17b of the beam splitter 11b. In the particular example shown in FIG. 2b the photodiode 29 is secured to the second surface 19b of the beam splitter 11b. Any suitable securing means can be used to secure the photodiode 29 to the second surface 19b of the beam splitter 11b.

FIG. 2c shows a further possible configuration for the beam splitter 11 and photodiode 29 in the optical device 1 shown in FIG. 1. The configuration shown in FIG. 2c is similar to that shown in FIG. 2b; the first surface 17c and second surface 19c of the beam splitter 11c are not parallel; rather the beam splitter is wedge-shaped. Unlike the configuration shown in FIG. 2b, the second surface 19c of the beam splitter 11c is vertical and the first surface 17c of the beam splitter 11c is offset from the vertical normal. The photodiode 29 is arranged to be parallel to the second surface 19c. As the first surface 17c and second surface 19c of the beam splitter 11c are not parallel, by arranging the photodiode 29 so that it is parallel to the second surface 19c, the photodiode 29 will be arranged so that it is offset from being parallel to the first surface 17c of the beam splitter 11c. In the particular example shown in FIG. 2c the photodiode 29 is secured to the second surface 19c of the beam splitter 11c. Any suitable securing means can be used to secure the photodiode 29 to the second surface 19c of the beam splitter 11c. A further feature of the optical device 1 that it comprises a single electrically conducting member which is configured to electrically connect each of the light sources 3a,b,c, photodiode 29, and MEMS micro-mirror device 21. The single electrically conducting member may electrically connect each of the light sources 3a,b,c, photodiode 29, and MEMS micro-mirror device 21, detecting means 35, and controller 32. FIG. 3 provides a perspective view of a single electrically conducting member 40 used in the optical device of FIG. 1; FIG. 3 shows the single electrically conducting member 40 isolated from the optical device 1. The single electrically conducting member 40 comprises flexible material, which enables the single electrically conducting member 40 be flexed as required.

As shown in FIG. 3 the single electrically conducting member 40 comprises five electrical contacts 41a-e; electrical contacts 41a-c are used to establish an electrical connection with each of the light sources 3a,b,c, respectively; electrical contact 41d is used to establish an electrical connection with the photodiode 29; and electrical contact 41e is used to establish an electrical connection with the MEMS micro-mirror device 21. The single electrically conducting member 40 comprises a main conducting platform 43 which electrically connects each of the five electrical contacts 41a-e. It will be understood that the electrically conducting member 40 may be provided with any number of electrical contacts. The number of electrical contacts provided in the electrically conducting member 40 may depend on the number of components which the electrically conducting member is to electrically connect.

The optical device 1 shown in FIG. 1 further comprises a package 37. The package 37 houses the light sources 3a,b,c, the beam combiner 7, the beam splitter 11, and the photodiode 29 The package 37 may also be configured to house the MEMS micro-mirror device 21, or alternatively, as will be discussed later, the MEMS micro-mirror device 21 may define part of the package 37.

A window 39 is provided in the package 37. Light reflected by the MEMS micro-mirror 23 can be emitted from inside the package 37 through the window 39 so that it can be incident on the display screen 27 to project the projected image 25 on the display screen 27. The window 39 may have any suitable configuration. The window 39 may be configured to adjust the optical characteristics of the light which passes through it. The window 39 may take any suitable configuration which is required to adjust the optical characteristics of the light which passes through it, as desired. The window 39 is configured to vibrate so as to reduce speckle effects; the optical device 1 comprises a vibration means (not shown) which is operable to vibrate the window 39.

Figure 4A:
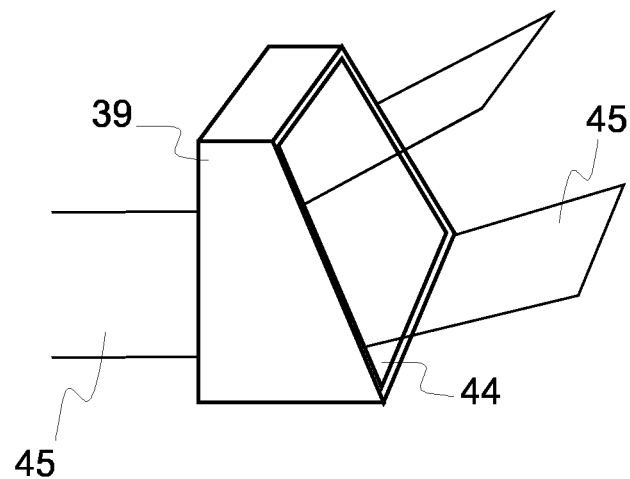
FIGS. 4a-d provide perspective view of windows which could be used in the device of FIG. 1, FIGS. 4e and 4f provide side views of prisms, FIG. 4g provides a side view of a reflective plate, which may be provided in addition, or alternatively, to a window
Figure 4B:
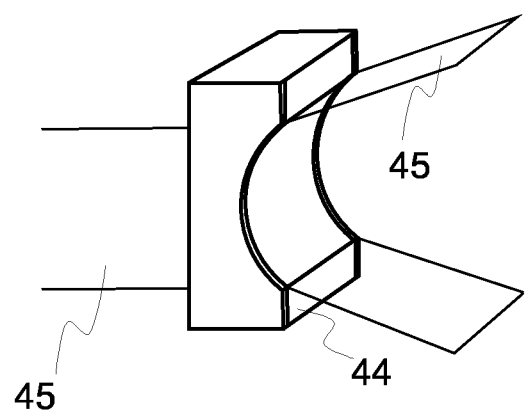
Figure 4C:
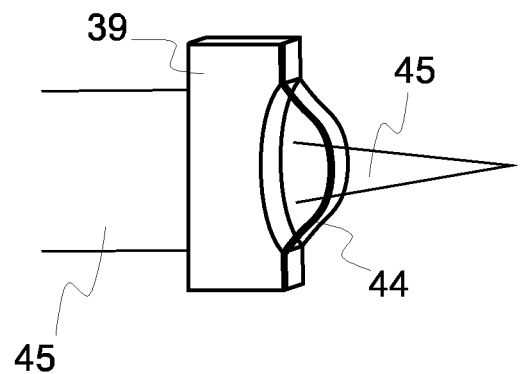
Figure 4D:
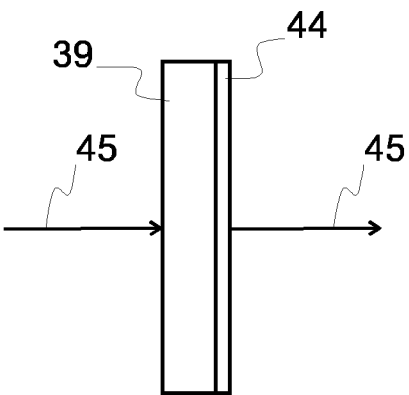
Figure 4E:
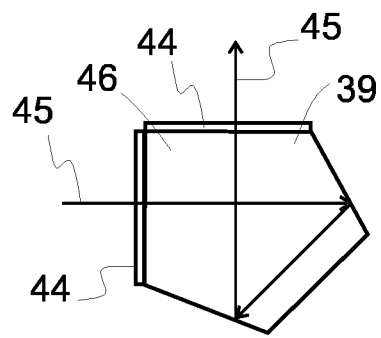
FIG. 4h illustrates a further possible configuration for the window used in the device of FIG. 1.

FIGS. 4a-e provides a perspective view of examples of how the window 39 could be configured so that it will adjusts the optical characteristics of light 45 which passes though it. FIG. 4a shows how the window 39 may be configured to redirect the direction of the light 45 which passes through it i.e. redirect light 45 upwards; optionally, the window 39 shown in FIG. 4a may be configured to redirect the direction of the light 45 so that the light 45 is directed vertically i.e. the light 45 is redirected through 90 degrees from a horizontal direction in which it is incident on the window 39, to a vertical direction as it is leaves the window 39. FIG. 4b shows how the window 39 may be configured to diverge the light 45 which passes through it. Diverging light 45 will increase the size of the projected image 25. FIG. 4c shows how the window 39 may be configured to focus the light 45 which passes through it. Focusing the light will decrease the size of the projected image and will enhance the image brightness. FIG. 4d shows that the window 39 may of course be configured so that the direction of light 45 remains is unaltered. FIG. 4e shows a further possible configuration for the window 39. FIG. 4e shows that the window 39 may be defined by prism 46. The prism 46 shown in FIG. 4e has five sides. It will be understood that the prism 46 could have any number of sides and is not limited to having five sides. The prism 46 which has five sides will be referred to as a penta-prism 46. The penta-prism 46 can redirect light 45 from a horizontal direction to a vertical direction; as is shown in FIG. 4e. The window 39 may further comprise an anti-speckle layer 44 which is provided on one or more surfaces of the window 39. The anti-speckle layer 44 will reduce the speckle effect occurring when the light 45 is projected through the window 39 onto a projection screen.

Figure 4F:
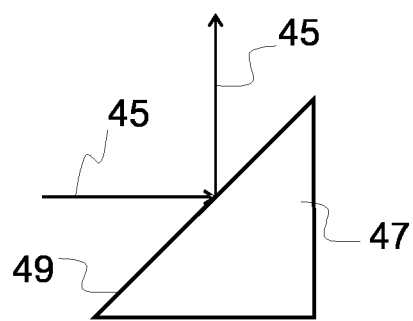
Figure 4G:
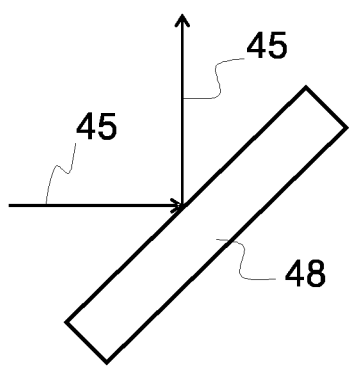

In addition to the window 39, or, as an alternative to the window 39, light which is reflected by the MEMS micro-mirror 23 can be emitted from inside the package 37, to a prism 47 or reflective plate 48. FIGS. 4f and 4g shows a prim 47 and reflective plate 48, respectively. The prism 47 has a face 49 which is arranged at 45° to the horizontal normal; it will be understood however that prism 47 could be alternatively be configured to have a face 49 which is arranged at any other angle to the horizontal normal. The plate 48 is also shown to be orientated at 45° to the horizontal normal. The prism 47 and reflective plate 48 are orientated so that they can redirect light 45 from a horizontal direction to a vertical direction. However it will be understood that the prism 47 and reflective plate 48 could be orientated in any other particular orientation to redirect light 45 in any other direction. Unlike the window 39, light 45 does not pass through the prism 47 or reflective plate 48.

If a prism 47 or reflective plate 48 is used in addition to the window 39, then the prism 47 or reflective plate 48 is arranged in the optical device 1 so that it will receive light 45 which passes through the window 39. If a prism 47 or reflective plate 48 is used as an alternative to the window 39, then the prism 47 or reflective plate 48 is arranged in the optical device 1 so that it receives directly light which is reflected by the MEMS micro-mirror 23.

The prism 47 and/or reflective plate 48 may further provided with an anti-speckle layer (not shown) on one or more surfaces of the prism 47 and/or reflective plate 48. The anti-speckle layer will reduce the speckle effect occurring when the light 45 is projected onto a projection screen.

The anti-speckle layer 44 may be configured to vibrate so as to further reduce speckle effects. The anti-speckle layer 44 may comprise material which can diffuse light. The anti-speckle layer 44 may comprise material which is configured to create multiple output light angle from a light beam which passes through the anti-speckle layer 44; the multiple output light angle may be small. The anti-speckle layer 44 may comprise material which is configured to create multiple polarization of a light beam that passes through the anti-speckle layer 44. The anti-speckle layer 44 may comprise material which is configured to create multiple wavelengths from a light beam which passes through the anti-speckle layer 44.

Material which can be used in the speckle reducing layer may be material which is typically diffractive, diffusive or material which creates holographic patterns in a semi-transparent medium like a polymer or a PMMA (Poly-methyl methacrylate), or material composed of nano-material which has the capabilities of diffusing or diffracting light. The creation of multiple polarization of a light beam can be done by having a LCD transmissive panel, which by default changes the light polarization.

The window 39 may be configured to dim light; for example the window may comprise a layer which is configured to dim light which passes through the window 39. The window preferably comprises an LCD transmissive panel the polarization of which can be adjusted. By changing the polarization of the LCD transmissive panel, the properties e.g intensity, of the light which pass through the LCD transmissive panel can be changed; therefore the intensity of the light output from the window can be reduced thus achieving dimming of light.

FIG. 4h, illustrates a further possible example of how the window 39 in the optical device 1 of FIG. 1, could be configured. As shown in FIG. 4h the window 39 may further comprise a functional part 101. The functional part 101 may be integral to the window 39. The functional part 101 preferably extends over part of a whole surface 103 of the window 39. The functional part 101 may comprise a photodiode which is configured to measure one or more characteristics of light which passes through the window 39. For example, the photodiode may be configured to measure light intensity and/or the angle or alignment of light which passes through the window 39. The functional part 101 may additionally, or alternatively, comprise a reflective surface. The reflective surface may be arranged to reflect at least some of the light which passes through the window 39 to a sensing device (not shown) which is configured to sense one or more characteristics of the light. The sensing device may be a photodiode. The functional part 101 may comprise a light absorption layer which is arranged to reduce the reflection of parasitic light from the window 39 to inside of the optical device 1.

Figure 5:
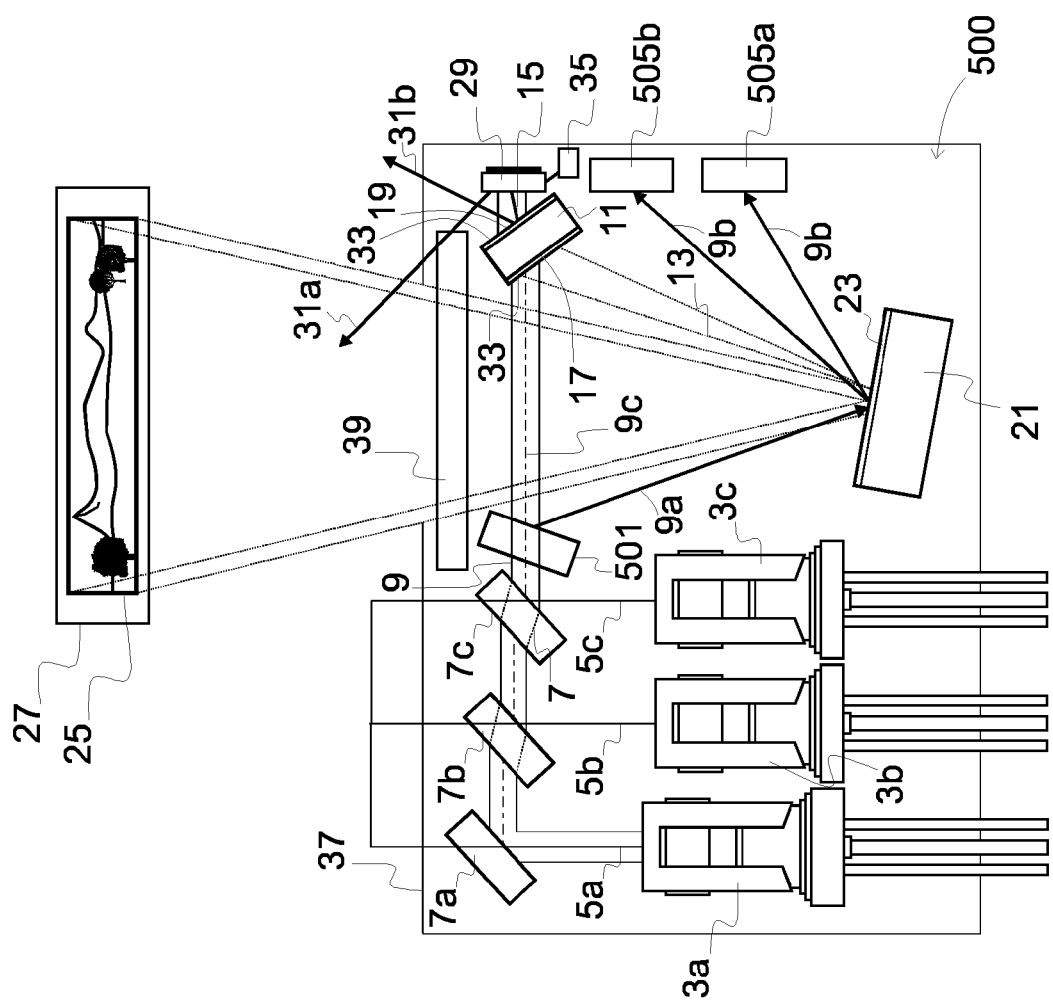
FIG. 5 provides an aerial view of an optical device according to a further embodiment of the present invention.

FIG. 5 provides an aerial view of an optical device 500 according to a further embodiment of the present invention. The optical device 500 has many of the same features as the optical device 1 shown in FIG. 1, and like features are awarded the same reference numbers.

The optical device 500 comprises a second beam splitter 501. The second beam splitter 501 is arranged in an optical path between the beam combiner (7,7a,7b,7c) and the beam splitter 11, so that the combined light beam 9 is received by the second beam splitter 501. The second beam splitter 501 is arranged to deflect a part 9a of the combined light beam 9 which it receives, to the MEMS micro-mirror 23. The part of the light which is not deflected to the MEMS micro-mirror 23 (i.e. light 9c), passes through the second beam splitter 501 to the beam splitter 11.

The optical device 500 further comprises a second and third photodiode 505a,b. The MEMS micro-mirror 23 is further arranged to deflect the light beam 9a, which it receives from the second beam splitter 501, to the second and third photodiodes 505a,b. The light deflected by the MEMS micro-mirror 23 (i.e. deflected light beam 9b) is received by the second and third photodiodes 505a,b. The second and third photodiodes 505a,b are configured to sense one or more characteristics of the deflected light beam 9b which they receive from the MEMS micro-mirror 23. The second and third photodiodes 505a,b are configured sense the position of the deflected light beam 9b; the position of the deflected light beam 9b correlates to the scanning angle of the MEMS micro-mirror 23, thus the scanning angle of the MEMS micro-mirror 23 can be determined from the sensed position of the deflected light beam 9b. The second and third photodiodes 505a,b are also configured to sense the rate of change of the position of the deflected light beam 9b which they receive from the MEMS micro-mirror 23; the rate of change of the position of the deflected light beam 9b correlates to the speed of the oscillation of the MEMS micro-mirror 23 and therefore the oscillation frequency of the MEMS micro-mirror 23 can be determined from the sensed rate of change of position of the deflected light beam 9b.

Figure 6:
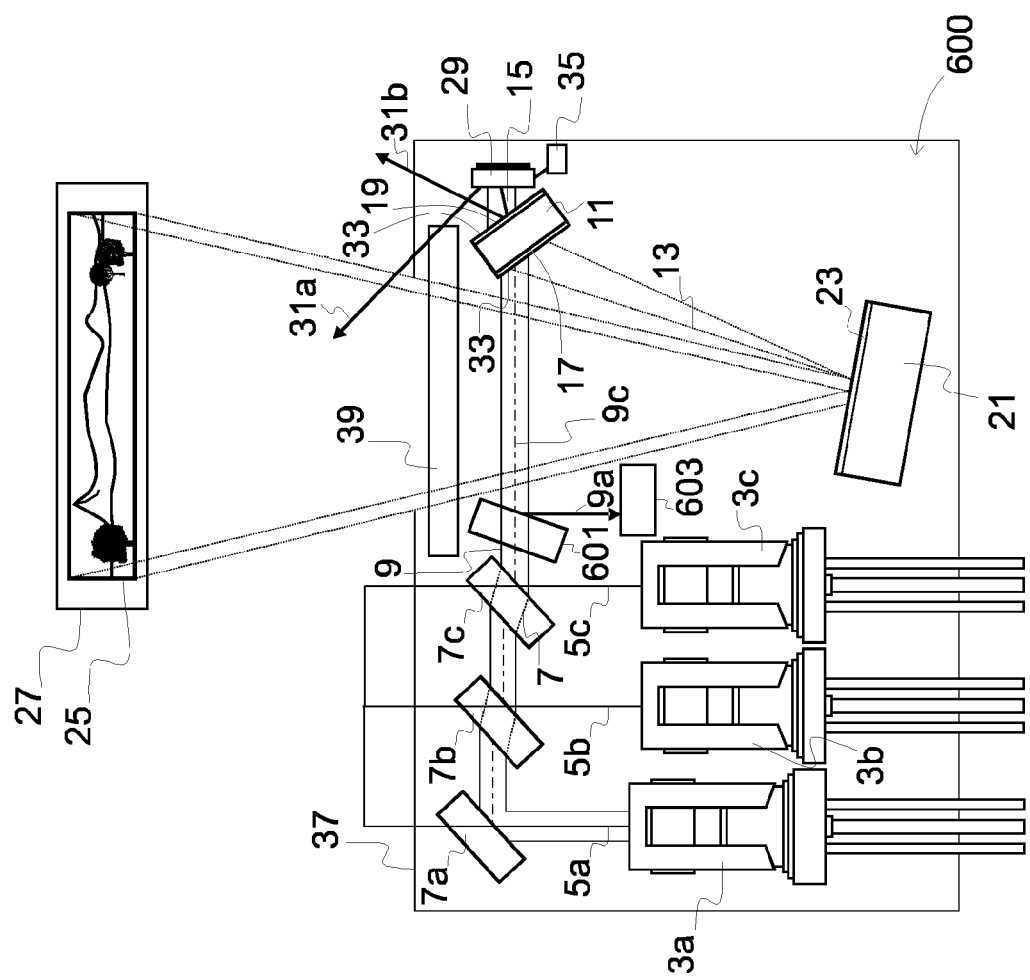
FIG. 6 provides an aerial view of an optical device according to a further embodiment of the present invention.

FIG. 6 provides an aerial view of an optical device 600 according to a further embodiment of the present invention. The optical device 600 has many of the same features as the optical device 1 shown in FIG. 1, and like features are awarded the same reference numbers.

The optical device 600 also comprises a second beam splitter 601. The second beam splitter 601 is arranged in an optical path between the beam combiner (7,7a,7b,7c) and the beam splitter 11, so that the combined light beam 9 is received by the second beam splitter 601. The second beam splitter 601 is arranged to deflect a part 9a of the combined light beam 9, which it receives, to a device 603. The part of the light which is not deflected to the device 603 (i.e. light 9c), passes through the second beam splitter 601 to the beam splitter 11.

The device 603 is configured to detect one or more characteristics of light. The device 603 may be a photodiode, a spectrometer, or any other means operable to detect one or more characteristics of light. When the device 603 receives the light 9a which is deflected from the second beam splitter 601, it operates to detect one or more characteristic of the light 9a.

Figure 7:
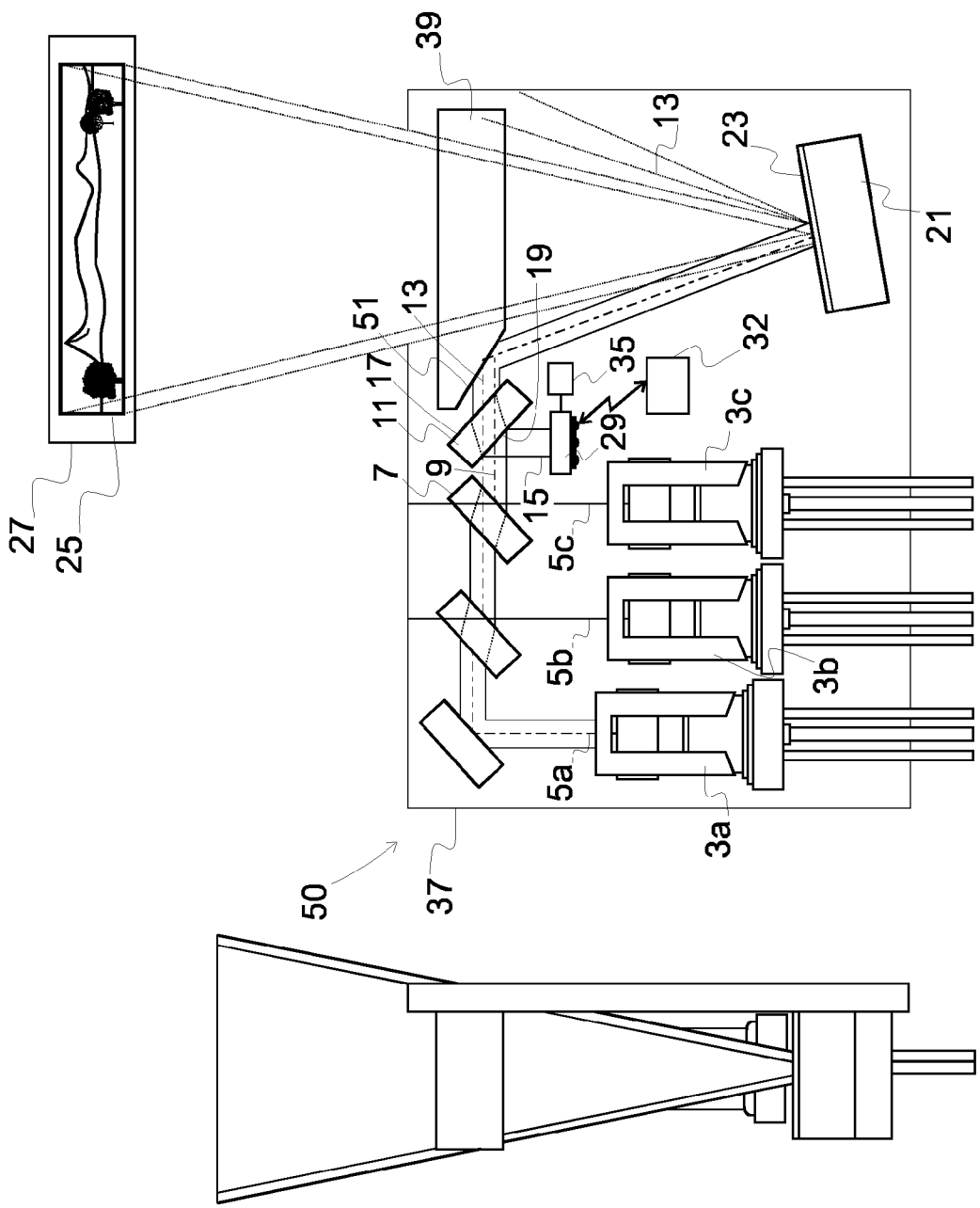
FIG. 7 provides an aerial view of an optical device according to a further embodiment of the present invention.

FIG. 7 provides an aerial view of an optical device 50 according to a further embodiment of the present invention. The optical device 50 has many of the same features as the optical device 1 shown in FIG. 1 and like features are awarded the same reference numerals. Unlike the optical device 1 shown in FIG. 1, beam splitter 11 and photodiode are positioned so that the primary light beam 13 reflected by the MEMS micro-mirror 23 does not pass through the combined light beam 9.

The optical device 50 further comprises a reflective means in the form of a reflective surface 51 which is integral to the window 39. The reflective surface 51 is arranged to receive the primary light beam 13 from the beam splitter 11 and to reflect the primary light beam 13 to the MEMS micro-mirror 23 of the MEMS micro-mirror device 21. Typically, in prior art devices, the reflective means is provided as a separate reflective mirror component; however, the present invention advantageously achieves a more compact optical device 50 by integrating a reflective surface 51 into the window 39. The optical device 50 will also have less individual optical components compared to prior art optical devices.

FIG. 8a provides an aerial view of a possible configuration for the package 37 used in each of the optical devices 1,50 described above. FIG. 8b provides a rear view of the package 37 shown in FIG. 8a.

As can be seen from FIG. 8a the package 37 is configured to enable the MEMS micro-mirror device 21 to define at least part of a surface 61,63,65,67 of the package 37. FIG. 8a shows that an upper-surface 69 of the MEMS micro-mirror device 21 defines part of an upper-surface 61 of the package 37. Side surfaces 73,75 of the MEMS micro-mirror device 21 also define part of a side-surfaces 63,65 respectively of the package 37. As can be more clearly seen from FIG. 6b, a lower-surface 71 of the MEMS micro-mirror device 21 also defines part of a lower-surface 67 of the package 37. Thus, the MEMS micro-mirror device 21 defines part of each of the surfaces 61,63,65,67 of the package 37. It should be understood that the package 37 could alternatively be configured so that the MEMS micro-mirror device 21 defines part of only some of the surfaces 61,63,65,67 of the package 37; for example the package 37 could be configured to enable just the upper-surface 69 of the MEMS micro-mirror device 21 and the lower-surface 71 of the MEMS micro-mirror device 21 to define respectively part of the upper surface 61 and lower surface 67 of the package 37 only.

Advantageously, as the MEMS micro-mirror device 21 defines at least part of a surface 61,63,65,67 of the package 37, the optical device 1,50 becomes more compact. For example, if the upper-surface 69 and lower-surface 71 of the MEMS micro-mirror device 21 each define part of the upper surface 61 and lower surface 67 of the package 37, respectively, then the overall thickness of the optical device 1,50 can be reduced as the package 37 will not extend over an upper surface 69 and lower surface 71 of the MEMS micro-mirror device 21. In such a case, the thickness 't' of the optical device 1,50 will not be more than a thickness "T" of the MEMS micro-mirror device 21. As the overall thickness 't' of the optical device 1, 50 is reduced a more compact optical device 1,50 can be achieved.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. An optical device, comprising:
   a plurality of light sources, each of the plurality of light sources to provide a light beam;
   at least one beam combiner to combine the light beams from the plurality of light sources to provide a combined light beam;
   a beam splitter comprising a first surface and a second surface, the beam splitter to receive the combined light beam and to split the combined light beam into a primary light beam and a secondary light beam, the primary light beam to be emitted through the first surface and the secondary light beam to be emitted through the second surface, the secondary light beam comprising one or more characteristics indicative of one or more characteristics of the primary light beam;
   a mirror arranged to reflect the primary light beam emitted through the first surface of the beam splitter, the mirror to oscillate about at least one oscillation axis to scan the primary light beam; and
   a photodiode to receive the secondary light beam and to detect one or more characteristics of the secondary light beam, the photodiode configured such that a surface of the photodiode is offset from being parallel to the first surface and the second surface to reduce an amount of parasitic light directed to the mirror.

2. The optical device according to claim 1, comprising a controller, the controller to:
   receive an information element including an indication of the one or more characteristics of the secondary light beam; and
   send a control signal to the plurality of light sources to maintain the one or more characteristics of the primary light beam at one or more predefined characteristics.

3. The optical device according to claim 1, the beam splitter to be in direct optical communication with the mirror.

4. The optical device according to claim 1, comprising:
   a package comprising a window to transmit the primary light beam reflected by the mirror; and
   a reflective surface to receive the primary light beam from the beam splitter and to reflect the primary beam to the mirror, wherein the reflective surface is integral to the window.

5. The optical device according to claim 1, wherein the beam combiner, the beam splitter, and the mirror are arranged such that the primary light beam reflected by the mirror passes through the combined light beam to reduce speckle in the primary light beam reflected by the mirror.

6. The optical device according to claim 1, comprising a window to transmit the primary light beam reflected by the mirror, the window to adjust at least one of the one or more characteristics of the primary light beam.

7. The optical device according to claim 6, wherein the window is configured to reduce speckle effect.

8. The optical device according to claim 1, further comprising a package, wherein the mirror is defined by at least part of a surface of the package.

9. The optical device according to claim 1, comprising a second beam splitter to deflect a part of the combined light beam.

10. The optical device according to claim 1, comprising an electrically conducting member to electrically connect each of the plurality of light sources, the photodiode, and the mirror.

11. A method of projecting an image, comprising:
    emitting a light beam from each of a plurality of light sources;
    combining the light beams to provide a combined light beam;
    splitting, at a beam splitter, the combined light beam into a primary light beam and a secondary light beam, the beam splitter comprising a first surface through which the primary light beam is emitted and a second surface through which the secondary light beam is emitted, the secondary light beam comprising one or more characteristics that are indicative of one or more characteristics of the primary light beam;
    reflecting, from the beam splitter, the primary light beam to a mirror;
    receiving the secondary light beam at a photodiode, a surface of the photodiode offset from being parallel to at least one of the first surface or the second surface;
    detecting one or more characteristics of the secondary light beam using the photodiode;
    processing the detected one or more characteristics of the secondary light beam to determine one or more characteristics of the primary light beam;
    oscillating the mirror about one or more axes to scan the primary light beam to project an image onto a display screen; and
    passing the primary light beam reflected from the mirror through the combined light beam to reduce speckle in the primary light beam.

12. The method according to claim 11, comprising adjusting one or more of the plurality of light sources so that one or more characteristics of the primary light beam match one or more predefined characteristics.

13. The method according to claim 11, wherein the surface of the photodiode is offset from being parallel to both the first surface and the second surface.

14. The method according to claim 11, comprising transmitting the primary light beam reflected by the mirror through a window to adjust at least one of the one or more characteristics of the primary light beam.

15. A projector comprising:
    a plurality of light sources, each of the plurality of light sources to provide a light beam;
    at least one beam combiner to combine the light beams from the plurality of light sources to provide a combined light beam;
    a beam splitter comprising a first surface and a second surface, the beam splitter to receive the combined light beam and to split the combined light beam into a primary light beam and a secondary light beam, the primary light beam to be emitted through the first surface and the secondary light beam to be emitted through the second surface, the secondary light beam comprising one or more characteristics indicative of one or more characteristics of the primary light beam;

a mirror arranged to reflect the primary light beam emitted through the first surface of the beam splitter, the mirror to oscillate about at least one oscillation axis to scan the primary light beam across a display surface to project an image; and a photodiode to receive the secondary light beam and to detect one or more characteristics of the secondary light beam, the photodiode configured such that a surface of the photodiode is offset from being parallel to the first surface and the second surface to reduce an amount of parasitic light directed to the mirror.

16. The projector of claim 15, wherein the mirror is arranged to reflect the primary light beam emitted through the first surface of the beam splitter to pass through the combined light beam to reduce speckle in the reflected light beam.

17. The projector of claim 15, comprising a window to transmit the primary light beam reflected by the mirror, the window to adjust at least one of the one or more characteristics of the primary light beam.

18. The projector of claim 15, wherein the window is configured to reduce a speckle effect of the projected image.

\* \* \* \* \*